UNITED STATES PATENT OFFICE.

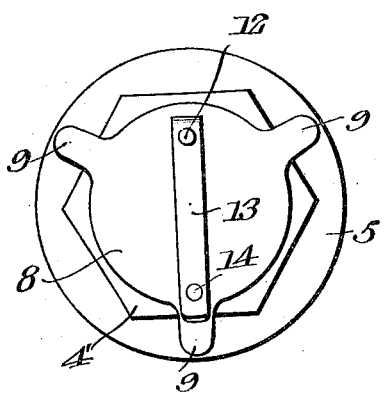
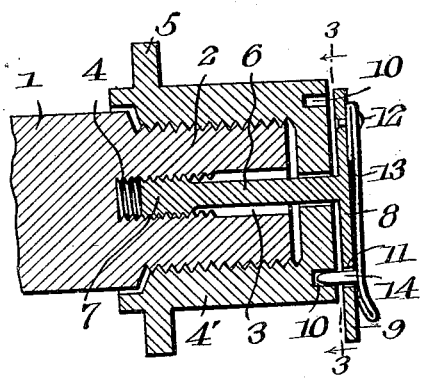
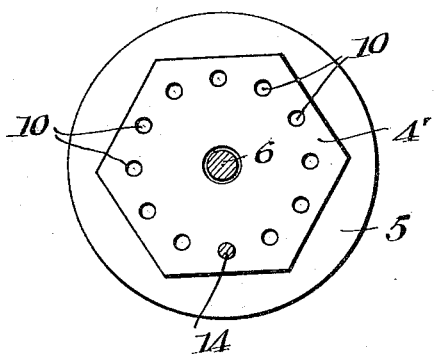
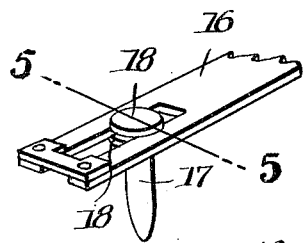
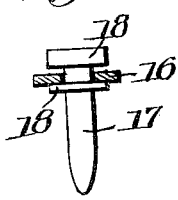
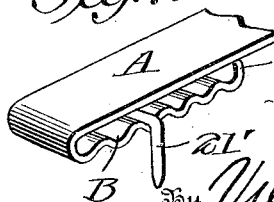

WILLIAM S. LAIL, OF CONNELLYS SPRINGS, NORTH CAROLINA.

NUT-LOCK.

1,139,196.
Specification of Letters Patent.
Patented May 11, 1915.

Application filed May 29, 1914. Serial No. 841,886.

*To all whom it may concern:*

Be it known that I, WILLIAM S. LAIL, a citizen of the United States, residing at Connellys Springs, in the county of Burke and State of North Carolina, have invented new and useful Improvements in Nut-Locks, of which the following is a specification.

The present invention relates to improvements in nut locks, the primary object being to provide a simple but effective means for sustaining a nut in locked position upon the spindle of a vehicle axle, but which will also permit of the removal of the nut therefrom when desired.

With the above and other objects in view, the improvement resides in the construction, combination and arrangement of parts set forth in the following specification and falling within the scope of the appended claim.

In the drawing: Figure 1 is a front elevation illustrating the application of my improvement, Fig. 2 is a central longitudinal sectional view through the same, Fig. 3 is a detail transverse sectional view on the line 3—3 of Fig. 1, Fig. 4 is a detail perspective view of a modified form of a spring catch and the detent therefor, Fig. 5 is a transverse sectional view approximately on the line 5—5 of Fig. 4, Fig. 6 is a still further modified form of a spring member and a detent therefor, and Fig. 7 illustrates a still further detail construction of the spring and detent.

Referring now to the drawing in detail, the numeral 1 designates an axle spindle having its reduced threaded end 2 formed with a centrally arranged longitudinally extending circular depression or bore 3. The bore 3 has its inner portion provided with threads 4, the pitch of which is opposite to the pitch of the threads 2.

The numeral 4' designates the nut for the spindle. This nut is provided with the usual flange 5 having an outer closed face and having its bore threaded to receive the threads of the spindle.

The outer face of the nut is provided with a central rounded opening through which extends the stem of the reduced non-threaded portion 6 of a bolt 7. The bolt is adapted to engage with the threads in the bore of the spindle. The shank of the bolt is provided with a head 8, the same preferably having its periphery formed with projections 9, whereby the said head may be revolved upon the nut to unscrew the threads of the bolt from those in the bore of the spindle when it is desired to permit of the separation of the nut from the spindle. The head 8 is preferably welded or otherwise secured to the stem 6 of the bolt 7, and the opening in the face of the nut through which the stem passes is of a less area than the cross sectional diameter of the threaded portion 7 of the said bolt, so that the bolt and head preferably remain permanently upon the nut. The outer face of the nut is formed with a plurality of concentrically arranged depressions 10, which are arranged to aline with an opening 11 in the head 8, and the said head upon its outer face, has pivotally connected thereto, as at 12, a flat spring 13, the free end of the spring being provided with an angularly arranged tooth or detent 14 which is adapted to pass through the opening in the head and to engage with one of the openings in the outer face of the nut and to sustain the head in locked position upon the nut.

The end of the spring formed with the detent 14 may be, and preferably is, provided with a lip whereby the detent may be readily drawn through the opening in the head and the spring revolved to permit of the detent to rest upon the head, while the peripheral extensions or projections of the head will permit of the rotation thereof and the rotation of the bolt to arrange the same within the threaded bore of the spindle or unscrew it therefrom.

In Fig. 4 of the drawing I have illustrated a modified form of the spring which is designated by the numeral 16, the same having a slotted end disposed opposite its pivot, and arranged within the slot is a detent 17, the same having spaced heads 18—18, one of the heads engaging with the upper face of the spring and the second head engaging with the underface of the spring whereby the detent may be moved longitudinally of the spring.

In Fig. 6 I have illustrated a still further modified form of the spring which is indicated by the numeral 19. This spring has its end opposite its pivot lapped to provide an overlying portion 20, the inner edge of which is bent downwardly to engage with the spring, while arranged between the spring and the overlapping portion is a substantially U-shaped detent 21, both of the legs of which are adapted to engage within the openings in the outer face of the nut, and the head of the bolt is provided with an enlarged opening or with a pair of openings to receive the said points. This detent is also slidable upon the spring, as will readily be understood.

While the device has been described in connection with a spindle and a nut for the spindle, it is to be understood that the same, with a slight alteration, which falls within the scope of my claim, may be employed with equal success in connection with an ordinary bolt.

In Fig. 7 the spring A is illustrated as having its end bent beneath the spring proper and continued in a parallel plane with the spring, the end of the underlying portion, indicated by the character C, being extended toward and contacting with the underface of the spring A. The end of the spring is corrugated or provided with intersecting depressions and enlargements, one of the said depressed portions adapted to receive the connecting member of a substantially U-shaped detent 21. The detent is forced toward the spring A by the underlying portion thereof, and one of the depressions B provides a pocket for the said detent whereby the same may be swung and retained in such position when it is not desired to lock the nut upon the bolt.

Having thus described the invention, what I claim is:

A threaded spindle having a threaded bore, a nut for the spindle, said nut having its outer face provided with a central opening, a bolt having a reduced shank extending through the opening, a head for the shank having an irregular perimeter, said head having an opening, the outer face of the nut having a plurality of concentrically arranged depressions, a spring pivotally secured to the head, and a longitudinally movable detent arranged upon the head and adapted to pass through the opening thereof to engage with the depressions in the nut.

In testimony whereof I affix my signature in presence of two witnesses.

WILLIAM S. LAIL.

Witnesses:
A. H. ABERNETHY,
WILLIAM T. MCGALLIARD.

Copies of this patent may be obtained for five cents each, by addressing the "Commissioner of Patents, Washington, D. C."